March 10, 1959 F. F. HILLIX ET AL 2,876,724
METHOD FOR PRODUCING COMPOSITE CUP-SHAPED ARTICLES
Filed Aug. 26, 1953 7 Sheets-Sheet 1

INVENTORS
FOSTER F. HILLIX
STANLEY L. PHILLIPS
BY Hudson, Boughton,
Williams, David & Hoffmann
ATTORNEYS March 10, 1959 F. F. HILLIX ET AL 2,876,724
METHOD FOR PRODUCING COMPOSITE CUP-SHAPED ARTICLES
Filed Aug. 26, 1953 7 Sheets-Sheet 5

Fig.6  Fig.5

INVENTORS
FOSTER F. HILLIX
STANLEY L. PHILLIPS
BY Hudson, Boughton,
Williams, David & Hoffmann
ATTORNEYS March 10, 1959 F. F. HILLIX ET AL 2,876,724
METHOD FOR PRODUCING COMPOSITE CUP-SHAPED ARTICLES
Filed Aug. 26, 1953 7 Sheets-Sheet 6

INVENTORS
FOSTER F. HILLIX
STANLEY L. PHILLIPS
BY Hudson, Boughton,
Williams, David & Hoffmann
ATTORNEYS March 10, 1959

F. F. HILLIX ET AL

2,876,724

METHOD FOR PRODUCING COMPOSITE CUP-SHAPED ARTICLES

Filed Aug. 26, 1953

INVENTORS
FOSTER F. HILLIX
BY STANLEY L. PHILLIPS
Hudson, Boughton,
Williams, Davids & Hoffmann
ATTORNEYS United States Patent Office 2,876,724
Patented Mar. 10, 1959

2,876,724

METHOD FOR PRODUCING COMPOSITE CUP-SHAPED ARTICLES

Foster F. Hillix, Lakewood, and Stanley L. Phillips, Parkview Village, Ohio, assignors to Wedge Protectors, Inc., Cleveland, Ohio, a corporation of Ohio Application August 26, 1953, Serial No. 376,612

8 Claims. (Cl. 113—116)

This invention relates to the production of composite articles, such as paper-lined thread protectors, or other articles, comprising cup-shaped elements in nested relation and, as one of its objects, aims to provide a novel method for carrying out such production in a rapid and economical manner.

Another object is to provide a novel method for producing composite articles in which blanks severed from one strip of sheet material are applied to a second strip of sheet material, after which blanks are severed from the second strip, such that the latter blanks have the first blanks joined thereto.

A further object is to provide a novel method as above mentioned, in which one of the strips is of sheet metal suitable for forming the shell of the composite thread protector or other article, and the other strip is of a material suitable for forming the liner of the article and is preferably paper, although any other liner material could be used, such as metal, plastic or various forms of fibrous sheet material.

Still another object is to provide such a novel method in which the first blanks include projection means which is forced through the second strip for mounting the first blanks thereon, after which the second blanks carrying the respective first blanks are severed from the second strip.

Yet another object is to provide a novel method as above referred to in which the connected blanks are of a generally flat or disk-like shape, and in which the blanks are subjected simultaneously to a forming operation while in their connected relation.

It is also an important object of this invention that the projection means of the first blanks forms a shearing edge on a piercing punch means during the forcing of the projection means through the second strip, such that a sharp shearing edge for this purpose is always present on the piercing punch.

This invention further provides such a novel method in which the projection means of the first blanks is clinched, such that the paired blanks will be maintained in connected relation to facilitate the forming operation thereon.

As a further object, this invention provides a novel method of the kind mentioned in which the strips from which the first and second blanks are severed are advanced in such relation, preferably a crossing relation, that successive portions of one strip overlie successive portions of the other strip.

Yet another object is to provide such a novel method in which the projection means of the first blanks is an annular flange and in which the application of the first blanks to the second strip and the piercing of the second strip by such flange is accomplished as a continuation of the punching operation by which the first blanks are severed from the first strip.

Additionally, this invention provides a novel method in which the shaping of the connected blanks to article form is accomplished by pushing the blanks through the passage of a hollow forming die with the metal blank on the lead side of such movement through the die passage.

As a further object, the invention provides a novel method of the kind mentioned above, in which the die passage of the hollow forming die has grooves therein and in which interlocked folds are formed in the paired blanks during the shaping of the same to article form.

The invention can be further briefly summarized as consisting in certain novel method steps and in certain novel combinations of parts, as hereinafter described and particularly set out in the claims hereinafter described and particularly set out in the claims hereof.

In the accompanying sheets of drawings, forming a part of this specification:

Fig. 9 is a vertical section taken through the apparatus longitudinally of the other strip supporting and guiding means substantially as indicated by section line 9—9 of Fig. 2;

Figs. 10 to 13 inclusive are partial vertical sections corresponding, respectively, with different portions of Fig. 9, but showing the same on a larger scale; Fig. 10 showing the flange projection of the first blank being forced through the second strip; Fig. 11 showing the clinching of the flange projection; Fig. 12 showing the clinched condition of the flange projection; and Fig. 13 showing the forming dies in cooperating relation at the time when the forming operation on the connected blanks has just been completed;

Figures 1, 14, 15, 16, 17, 18, 19, 20, 21, 22:
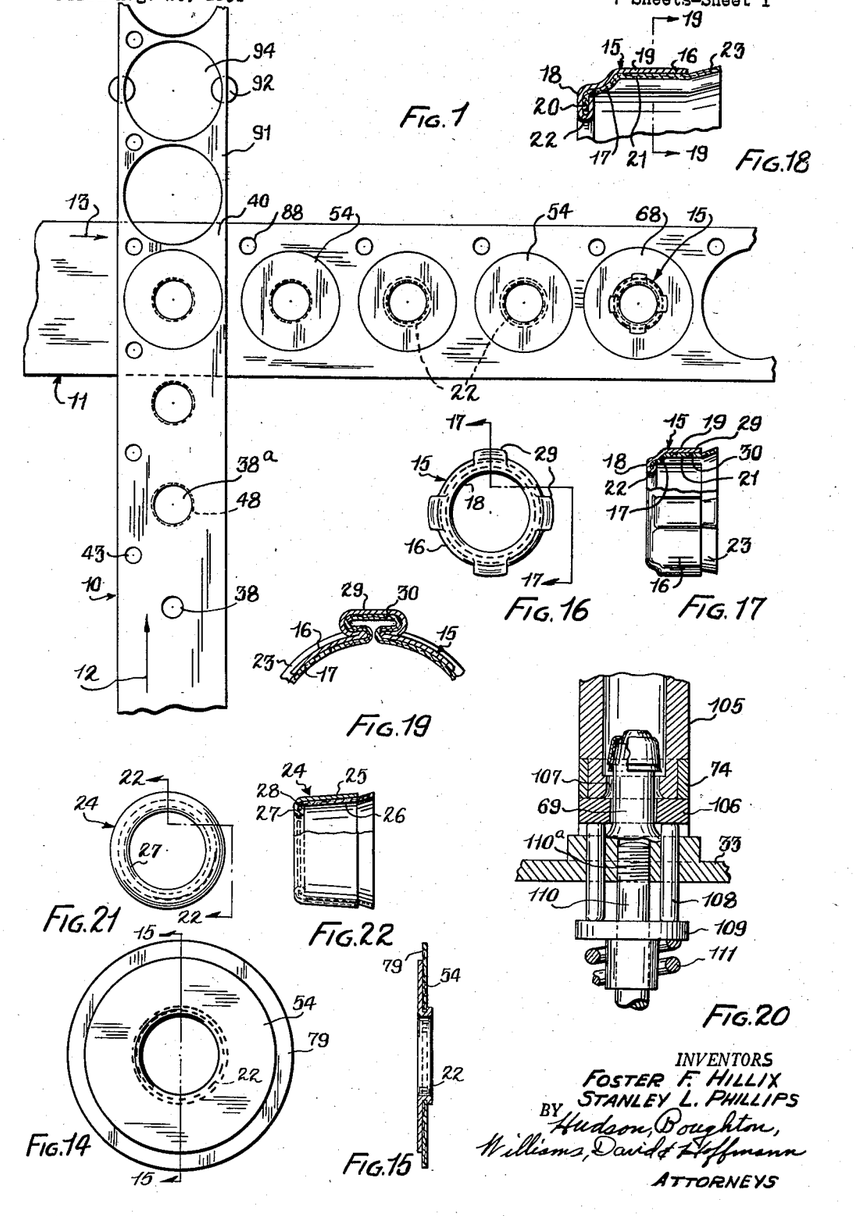
Fig. 1 is a plan view of a diagrammatic nature illustrating the sequence of the method steps and showing two strips from which the blanks for the composite article are punched.
Fig. 14 is a plan view showing the connected blanks just prior to their being subjected to the forming operation.
Fig. 15 is a transverse section taken through the connected blanks on section line 15—15 of Fig. 14.
Fig. 16 is an end view of a composite article produced by the method and apparatus of this invention.
Fig. 17 is a longitudinal section taken through the article as indicated by section line 17—17 of Fig. 16.
Fig. 18 is a larger scale view of a portion of the longitudinal section shown in Fig. 17.
Fig. 19 is a partial transverse section of the composite article taken on section line 19—19 of Fig. 18.
Fig. 20 is a partial vertical section similar to that of Fig. 13, but showing a modified construction for the forming die means.
Fig. 21 is an end view of a somewhat different composite article as produced by the modified forming die means of Fig. 20.
Fig. 22 is a longitudinal section through the article of Fig. 21 as indicated by section line 22—22 thereof.
Figure 2:
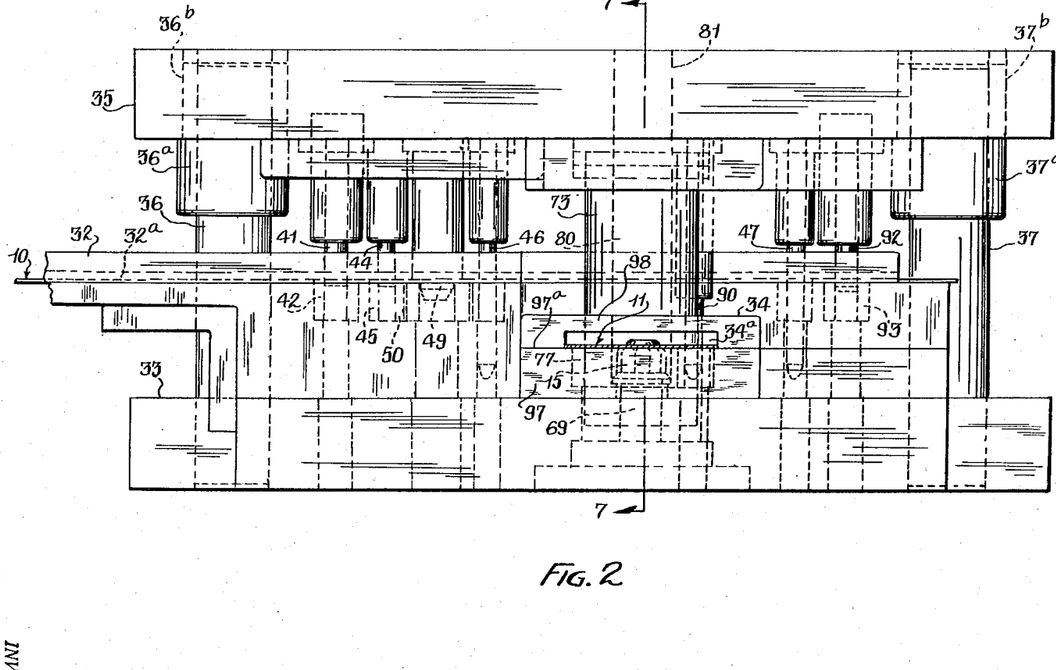
Fig. 2 is a front elevation showing apparatus provided by this invention and used in carrying out the method.
Figure 3:
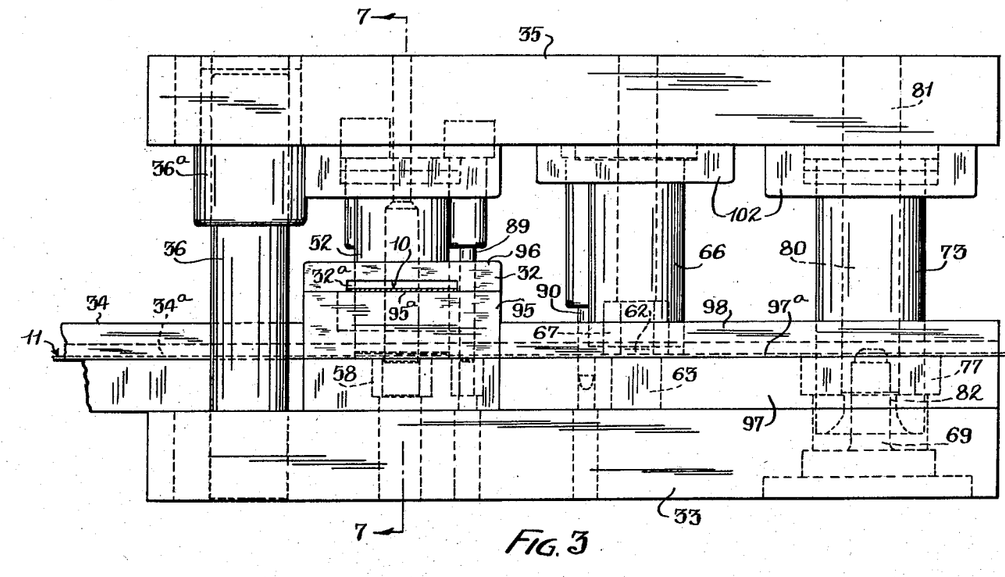
Fig. 3 is a side elevation of the apparatus.
Figure 4:
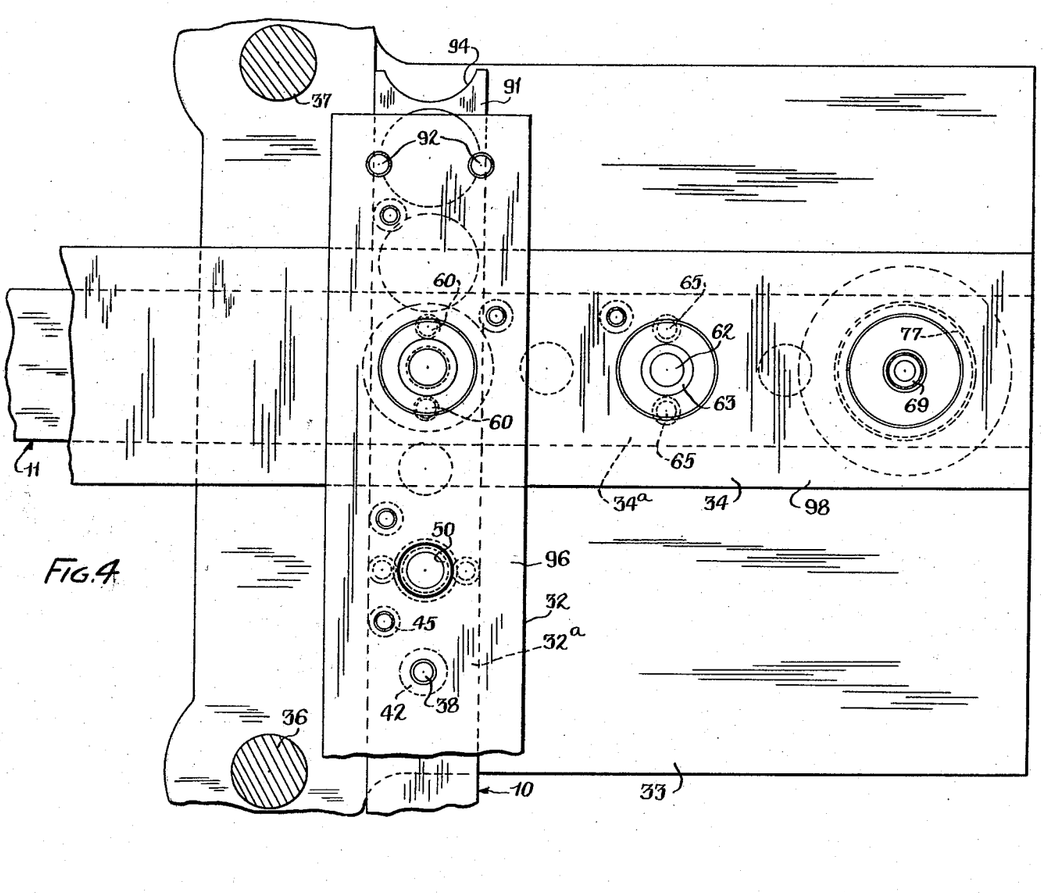
Fig. 4 is a top plan view of the die support.

The general procedure of the method and the sequence of the method steps thereof are illustrated diagrammatically in Fig. 1, wherein two strips of sheet material 10 and 11 are being advanced in the directions indicated by the arrows 12 and 13, and in such relation that successive portions of one strip, in this instance successive portions of the strip 10, are in or come into overlying relation to successive portions of the other strip. The strip 10 is a strip of sheet metal of a suitable gauge for forming the sheet metal shell or body of the composite article being produced, and the strip 11 is a strip of liner-forming material, such as a strip of suitable fibrous material or paper, although this second strip could, if desired, be a strip of plastic, sheet metal or any other suitable liner-forming material.

Before proceeding with the detailed description of the method and apparatus, it is advisable to describe the composite article being produced and of which one example comprises the paper-lined thread protector 15 shown in Figs. 16 and 17. This thread protector is of the kind intended to be telescopingly applied over the threaded end of a pipe, conduit, machine part, or other member, whose thread is to be protected against contamination or damage. The thread protector 15 comprises a cup-shaped sheet metal shell or body 16, and a cup-shaped liner 17 disposed in nested relation in the metal shell so as to lie between the metal shell and the thread to which the protector is applied in a covering relation.

The metal shell 16 includes a transverse end wall or flange 18 and an axially extending annular sleeve 19. The liner 17 also comprises a transverse end wall or flange 20 and an axially extending annular sleeve 21. The end flange 18 of the metal shell is in the form of or includes a radially disposed annular bead 22 which is clinched around and grips the radially disposed end flange 20 of the liner 17. The sleeve portion 21 of the liner lies against and in coextending relation to the sleeve portion 19 of the metal shell and, if desired, can be somewhat longer than the sleeve portion of the metal shell, such that the liner will have a flared end portion 23 at its open end which projects beyond the open end of the sleeve portion of the metal shell.

A modified form of composite article of this same general type is shown in Figs. 21 and 22 of the drawings. This modified composite article is also in the form of a thread protector 24 comprising a cup-shaped metal shell 25 and a cup-shaped paper liner 26 nested in such metal shell. The metal shell 25 has a transverse end wall or flange 27 at one end thereof similar to the flange 18 of the thread protector 15 and which is also in the form of or includes an annular bead clinched around an end flange 28 of the liner 26.

The thread protector 24 is a smooth or plain protector, that is to say, its metal shell 25 is devoid of external projections, ribs, or other irregularities, whereas in the thread protector 15, the metal shell 16 and the paper liner 17 have interlocked axially extending ribs 29 and 30 at circumferentially spaced points defined by folds formed in the sheet material of such metal shell and liner. The ribs 30 of the liner 17, together with the annular bead 22 hold the liner in securely connected relation with the metal shell. The projecting ribs 29 of the metal shell also serve as a means for gripping the thread protector 15 when the latter is to be removed from the thread to which it was previously applied.

The method and apparatus will now be further described with reference to the thread protector 15 as representing the composite article being produced. The sheet metal strip 10 is advanced with an intermittent step-by-step forward movement and during such movement is supported and guided in a supporting and guiding means 32 of a die support or die shoe 33. The liner strip 11 is, likewise, advanced with an intermittent step-by-step forward movement in timed relation to the metal strip 12, preferably in the right-angle crossing relation thereto shown in Fig. 1 and with the liner strip disposed below the metal strip. The liner strip 11 is supported and guided by a supporting and guiding means 34, which is also carried by the die support 33.

This advance movement of the metal strip 10 and the liner strip 11 takes place between the die support 33 and a reciprocably movable punch holder 35 carrying certain punches which will be referred to hereinafter. During the closing and opening movements of the punch holder 35 relative to the die support 33, the punch holder is aligned and guided by suitable guide pins 36 and 37 mounted in the die support and having guide portions 36ª and 37ª extending into guide openings 36ᵇ and 37ᵇ of the punch holder.

The closing movements of the punch holder 35 relative to the die support 33, take place between the intermittent advance movements of the strips 10 and 11, that is to say, take place during rest intervals in the forwarding feeding of these strips. During each such closing movement of the punch holder 35, an opening 38 is punched in the metal strip 10 substantially centrally thereof and at a point in advance of the point of crossing relation of the strips and which point of crossing relation is hereinafter referred to as the transfer station 40. The openings 38 are produced by the shearing cooperation of a punch 41 of the punch holder 35 and a hollow die 42 of the die support 33.

During each closing movement of the punch holder 35, a locating hole 43 is also punched in the metal strip 10 adjacent one edge thereof by the shearing cooperation of a punch 44 of the punch holder with a hollow die 45 of the die support 33. Positioning pins 46 and 47 of the punch holder 35 engage in these locating holes 43 for the purpose of accurately positioning the metal strip in the die mechanism.

During each closing movement of the punch holder 35, one of the previously punched openings 38 is enlarged into an enlarged opening 38ª and a projection means, in this instance an annular flange 48, is formed on the metal strip 10 in surrounding relation to such enlarged opening. This projection means or flange 48 provides the material which later forms the annular connecting bead 22 of the finished article. This projection means of the metal strip 10, which is hereinafter referred to merely as the flange 48, extends downwardly from the strip at substantially right angles to the plane of the strip and is formed by the action of a punch 49 of the punch holder 35 during its downward movement into a hollow die member 50 of the die support 33. During this downward movement of the punch 49, its reduced and conically tapered lower end 49ª deflects or draws downwardly the portion of the strip 10 defining the edge of the opening 38 to form the enlarged opening 38ª and the surrounding flange 48.

Figures 7, 8:
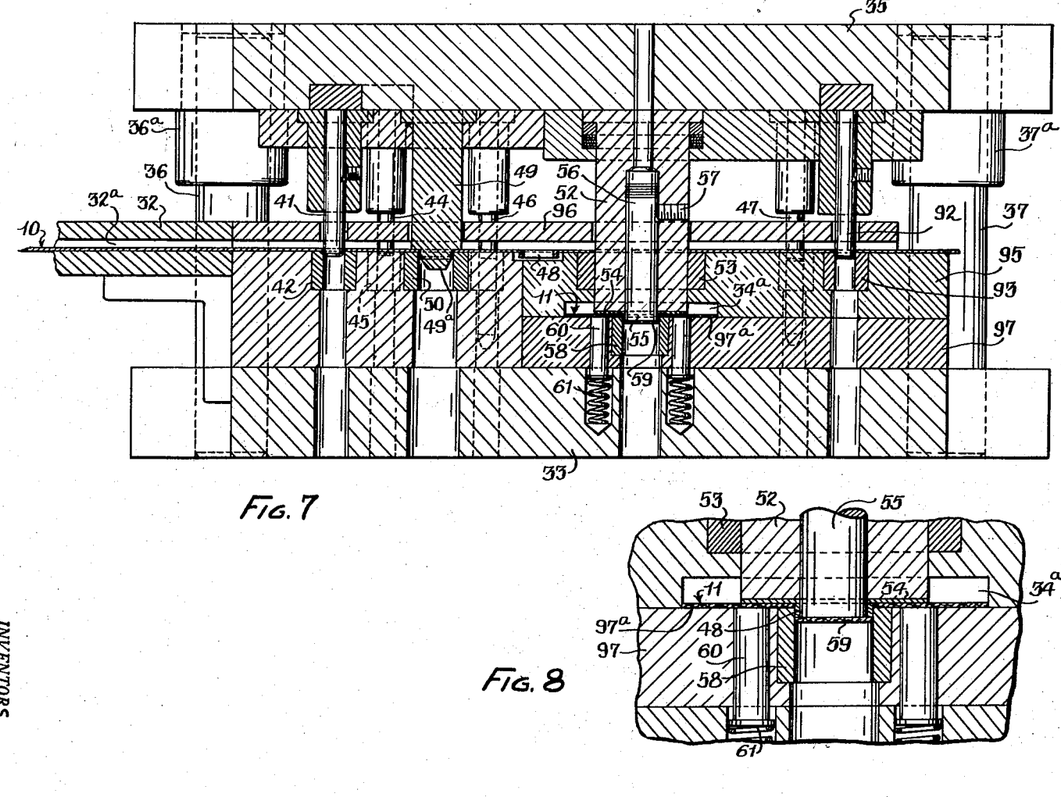
Fig. 7 is a vertical section taken through the apparatus longitudinally of one of the strip supporting and guiding means, substantially as indicated by section line 7—7 of Fig. 3.
Fig. 8 is a partial vertical section corresponding with a portion of Fig. 7 and showing the blanking die means thereof on a larger scale.

By the step-by-step forward movement of the metal strip 10, the flanged openings 38ª thereof are brought in succession to the transfer station 40. At this point, a blanking punch 52 of the punch holder 35 moves into a hollow blanking die 53 of the die support 33 in shearing cooperation therewith and punches a substantially disk-shaped metal blank 54 out of the metal strip. The metal blank 54 is of such shape that the previously formed flange 48 of the metal strip is located substantially centrally of this blank. The downward shearing movement of the blanking punch 52 carries the metal blank 54 downwardly through the hollow die 53 and transfers this blank to the liner strip 11, as shown in Figs. 7 and 8.

The blanking punch 52 carries a piercing punch 55 which projects below the blanking punch at a point centrally thereof so as to enter the opening 38a of the metal strip 10 during the punching of the metal blank 54 from the latter. The piercing punch 55 can be formed as an integral depending extension of the blanking punch 52, but preferably and as here shown, comprises a separate punch mounted in an axial passage 56 of the blanking punch and secured therein by a setscrew 57. The extent to which the piercing punch 55 projects beyond the blanking punch 52 is such that the piercing punch will move into the opening 38a for a distance approximately equal to, but not greater than, the axial length of the flange 48.

The continued downward movement of the blanking punch 52, by which the metal blank 54 is moved through the hollow blanking die 53 and transferred to the liner strip 11, causes the piercing punch 55 and the annular flange 48, in which the latter is now engaged, to pierce the liner strip 11 which, at this point, overlies a hollow shearing die 58 of the die support 33. During this piercing movement, the piercing punch 55 and the annular flange 48 move through the liner strip 11 and into the die passage of the shearing die 58. For this piercing step, the annular flange 48 of the metal blank 54 forms an annular shearing edge around the piercing punch 55 which cooperates with the hollow die 58 in shearing a disk or slug 59 from the liner strip as the flange pierces the latter.

The succeeding opening movement of the punch holder 35 withdraws the blanking punch 52 from the hollow blanking die 53 by moving the blanking punch upwardly away from the liner strip 11 and away from the metal blank 54 leaving the latter on the liner strip. During this upward or return movement of the blanking punch 52, the liner strip 11 is lifted relative to the hollow die 58 by a pair of ejector pins 60 having compression spring 61 thereunder, such that the flange 48 will be disengaged from the passage of the hollow die 58 to permit the next forward movement of the liner strip in its guiding and supporting means 34. The position of the metal blank 54 with its flange 58 extending through the liner strip 11, is such that the metal blank is now mounted on the liner strip and is carried forwardly by the latter.

The forward movement of the liner strip 11 with one or more of the metal blanks 54 thereon, brings these blanks in succession to a clinching station at which one of the metal blanks is located above and with its opening 38a in registering relation with the stem portion 62 of a shouldered die member 63 mounted in the die support 33. When in this position, the metal blank 54 is disposed with its annular flange 48 surrounding the stem portion 62 of the die member 63 and with the lower edge of this flange engaging the surrounding annular shoulder 64 of this die member.

The succeeding closing movement of the punch holder 35 causes a punch 66, carrying a die ring 67, to move downwardly into closed engagement with the die member 63. The lower end of the die ring 67 projects from the punch 66 and engages the upper surface of the metal blank 54 in overlying relation to the flange 48, such that this flange will be crimped or upset against the shoulder 64 of the die member 63 to thereby convert the flange 48 into the annular bead 22 which grips the edge of the portion of the liner strip through which this flange extends.

Figures 9, 10, 11, 12, 13:
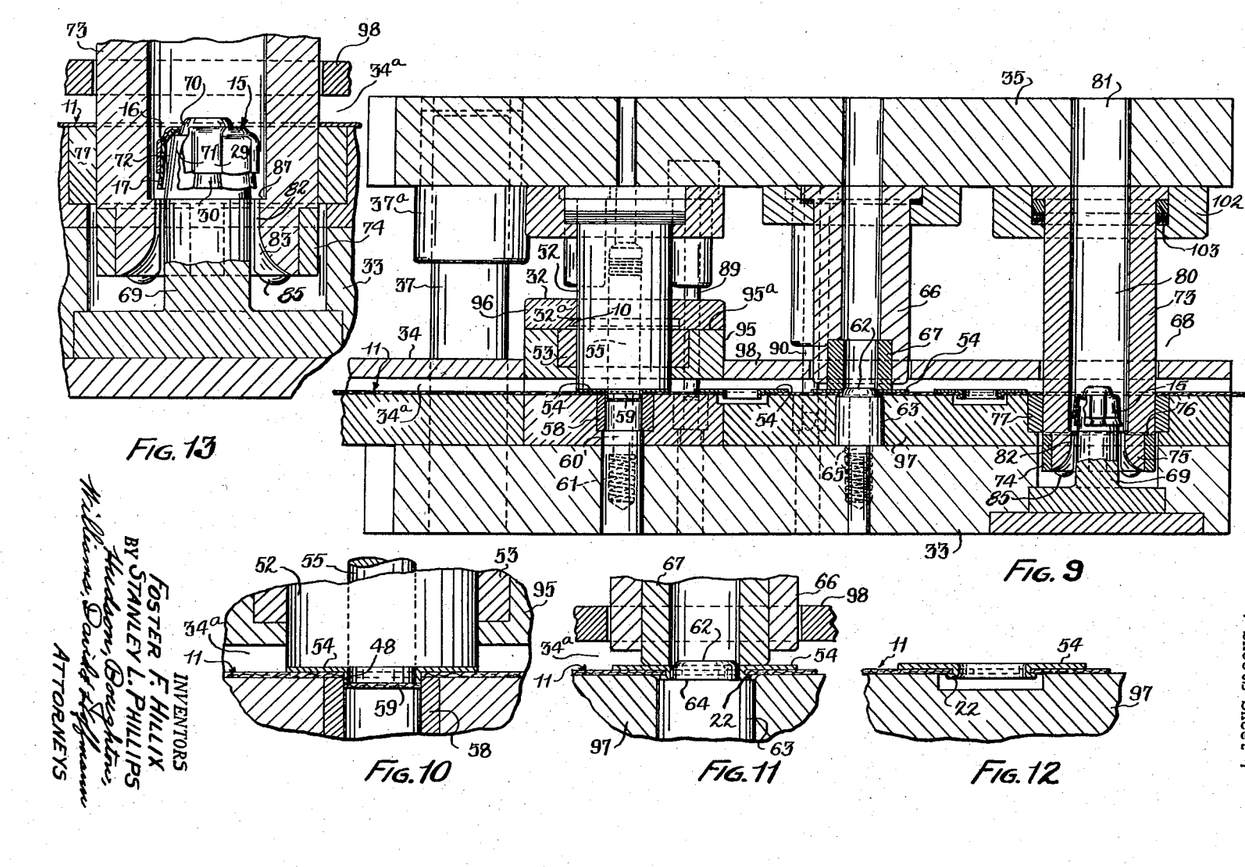

During the upward opening movement of the punch holder 35 which retracts the punch 66, the liner strip is lifted by a pair of ejector pins 65 for a distance sufficient to enable the annular bead 22 just formed, to clear the die member 63 during the succeeding advance movement of the liner strip 11. The condition of the liner strip as it leaves the clinching station is shown in Fig. 12 from which it will be seen that the metal blank 54 is securely attached to the liner strip by the annular bead 22.

The next forward movement of the liner strip 11 carries the attached metal blank 54 to the forming station 68 at which a combined blanking and forming operation is carried out. The forward movement of the metal blank 54 to the forming station 68 takes place while the liner strip 11 is in its lifted position to which it has been elevated by the ejector pins 60. This elevated position for the liner strip 11 permits the attached metal blank 54 to be moved over, and in alignment with, a die member or stake 69 mounted on the die support 33 and located at the forming station 68.

The die member 69 comprises an upright stem (see Fig. 13) having a reduced portion 70 at its upper end and extending above an annular shoulder 71. Just below the shoulder 71, the die stem 69 is provided with a downwardly enlarging annular tapered portion 72. The die member 69 also includes a base 69a by which this member is mounted on the die support 33.

At the location of the forming station 68, the punch holder 35 is provided with a forming punch 73 which cooperates with the die member 69 and carries a shearing die ring 74 and a hollow forming die 75. The shearing ring 74 is disposed in surrounding relation to the hollow forming die 75 and engages an annular seat 76 provided as a surrounding shoulder on the punch 73.

The shearing ring 74 is moved by the downward travel of the punch 73 into shearing cooperation with a hollow shearing die 77 which is mounted on the die support 33 in spaced surrounding relation to the tapered portion 72 of the die member 69. This movement of the shearing ring 74 into cooperation with the hollow shearing die 77 causes a liner blank 79 to be sheared from the liner strip 11. The liner blank 79 is a disk-like member of a larger size than the metal blank 54, as shown in Figs. 14 and 15, and each liner blank thus sheared from the strip 11 has one of the metal blanks 54 mounted thereon and secured thereto by the annular bead 22. The metal blank and the liner blank in their paired and connected relation constitute a composite blank from which a cup-shaped article will be formed as explained hereinafter.

The punch 73 is a hollow punch having an axial passage 80 extending upwardly therethrough and registering with a passage 81 extending through the punch holder 35. The passages 80 and 81 are clearance passages or article delivery passages of which the passage 80 is in axial alignment with and extends above the die passage 82 of the hollow forming die 75.

Figures 5, 6:
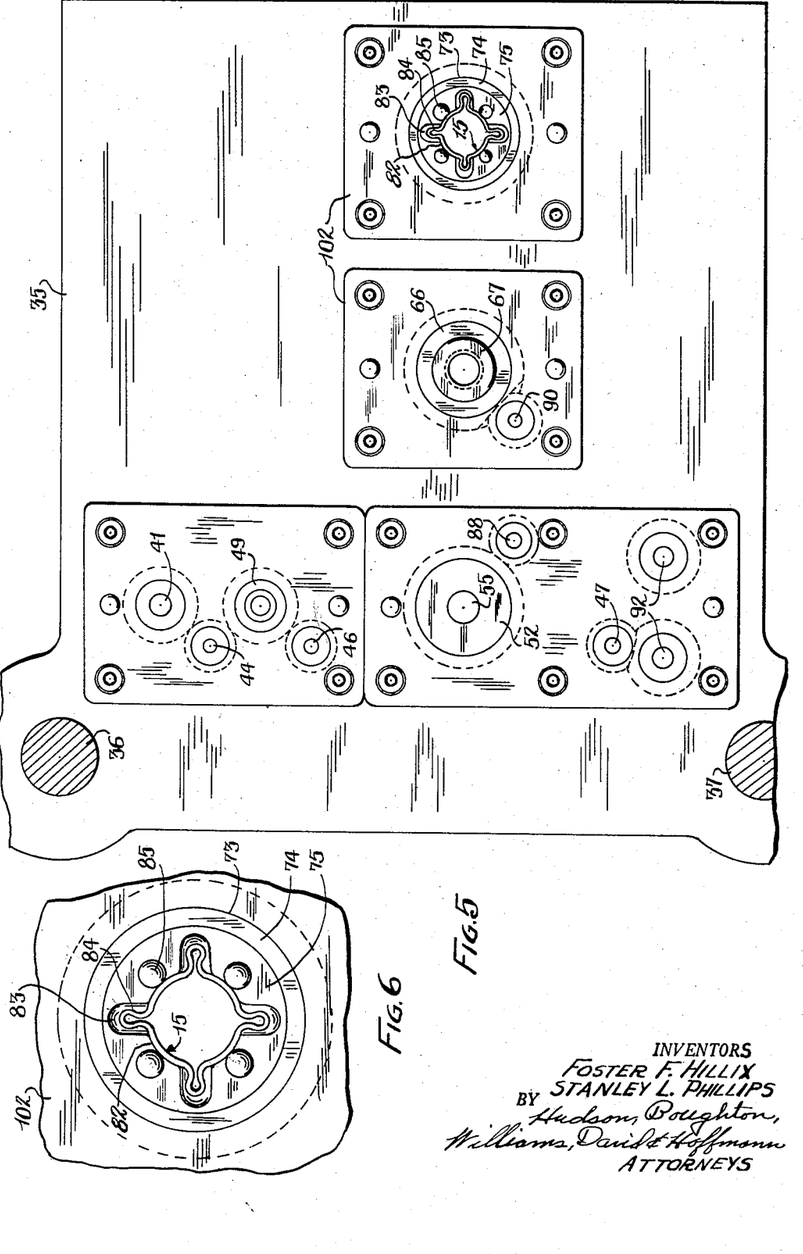
Fig. 5 is a bottom plan view of the punch holder.
Fig. 6 is a bottom plan view corresponding with a portion of Fig. 5 and showing the forming die on a larger scale.

The passage 82 of the hollow forming die 75 has a generally cylindrical shape, but is provided at circumferentially spaced points with axially extending grooves 83 which, at the lower end of this die passage, are of progressively varying depth. As shown in Figs. 9 and 13, the grooves 83 have a downwardly and outwardly flared shape, and the lower ends of these grooves extend through and provide interruptions 84 (see Figs. 5 and 6) in the lower end of the hollow forming die 75. At points intermediate the interruptions 84, the forming die 75 is provided with depending projections 85 which have a convexly rounded or substantially semispherical shape.

At the beginning of the downward movement of the forming punch 73, one of the metal blanks 54 while still attached to the liner strip 11 is at the forming station 68 with the annular bead 22 engaging or overlying the annular shoulder 71 of the die stem 69 and with the reduced upper end 70 of this stem extending through the central opening 38a of the metal blank. As the lower end of the forming punch 73 approaches the die stem 69, the depending projections 85 of the forming punch engage the metal blank 54 at spaced points around the central opening 38a of the latter, in this instance four such points, and start a downward deflection of corresponding portions of the metal blank while the annular bead 22 of the latter is seated on the shoulder 71 of the die stem.

Substantially simultaneously with the engagement of the metal blank 54 by the projections 85, or at least before any great amount of downward deflection of the engaged portions of the metal blank has taken place, the blanking ring 74 of the forming punch will engage the liner strip 11 outwardly of the peripheral edge of the metal blank and, by a shearing cooperation with the die ring 77, will punch out the liner blank 79 from the liner strip. Continued downward movement of the forming punch 73 moves the group of forming grooves 83 downwardly in surrounding relation to the die stem 69. At this time, the metal blank 54 and the liner blank 79 are being supported centrally thereof by the upper end of the die stem 69, and hence, the downward travel of the group of deflecting projections 85 and the downward travel of the group of forming grooves 83 take place relative to the pair of connected metal and liner blanks.

The continued downward movement of the group of deflecting projections 85 causes the spaced portions of the metal blank 54 engaged by these projections to be further deflected or bent downwardly while the portions of the metal blank intermediate the engaged portions are free to buckle upwardly into the forming grooves 83. The portions of the metal blank and of the liner blank which thus buckle upwardly into the forming grooves 83 are, at this intermediate stage of the forming operation, transversely arched corrugations having their tops extending into the forming grooves.

As the downward movement of the forming punch 73 continues relative to the die stem 69, the forming grooves 83 move downwardly in sliding engagement with the corrugations of the metal blank 54, whereupon the upwardly converging taper of the forming grooves causes the metal of the corrugations of the metal blank 54 and the material of the corrugations of the liner blank 79 to be progressively folded and the folds to be progressively closed, until by the time that the connected metal and liner blanks have moved through the die passage 82, the folded portions of these blanks will be of the condition shown in Figs. 18 and 19 and will constitute interlocked rib and key elements 29 and 30. During the forming of the interlocked ribs on the metal and liner blanks, portions of these blanks are also drawn or shaped to constitute the sleeve portions 19 and 21 of the completed cup-shaped article 15.

At the end of the downward mevement of the forming punch 73, the article 15 will have been carried by the die stem 69 into the clearance passage 80 to a point slightly above the internal shoulder 87 of this passage. The clearance passage 80 is of a diameter slightly larger than the maximum transverse dimension of the die passage 82, such that the articles 15 will have a relatively free upward movement in this clearance passage.

During the upward movement or return stroke of the forming punch 73, the internal shoulder 87 will act as a stripper for disengaging the completed article 15 from the upper end of the die stem 69. As the articles 15 are completed in succession, they will form a stack in the clearance passages 80 and 81, and when a sufficient number of the completed articles has accumulated, the upper end of the stack will emerge from the passage 81 for removal by an operator.

During the above-described operations performed on the liner strip 11 and on the metal blanks 54 implanted thereon, locating openings 88 are punched in succession in the liner strip adjacent one edge thereof by means of a punch 89 carried by the punch holder 35. The punch 89 is located on the die holder 35 so as to move past the adjacent edge of the metal strip 10, as shown in Fig. 9. A positioning pin 90 carried by the punch holder 35 and engageable in successive ones of the openings 88 is effective for positioning and holding the liner strip 11 with the metal blanks 54 thereof properly located with respect to the work stations represented by the die stems 63 and 69. The piercing and positioning members 89 and 90 thus accomplish the same locating function for the liner strip 11 as is accomplished for the metal strip 10 by the piercing and positioning members 44 and 46.

The portion of the metal strip 10 which advances beyond the forming station 68 is a scrap portion 91 as shown in Fig. 1, and can be conveniently cut into relatively short pieces by a pair of laterally spaced cutting punches 92 carried by the punch holder 35 and cooperating with a pair of die rings 93 of the die holder 33. The cutting punches 92 engage and cut the scrap strip 91 at diametrically opposite points of the relatively large opening 94 of this strip from which the metal blank 54 was previously punched. Similar cutting punches can also be provided for the scrap portion of the liner strip 11, although when the latter strip is of paper or other tearable material, such cutting punches are not needed.

The guiding and supporting means 32 for the metal strip 10 includes a longitudinal guideway $32^a$ having a substantially flat floor or support surface therein. The floor of the guideway $32^a$ is formed by the flat top surface $95^a$ of a relatively elevated portion 95 of the die support 33 and by a longitudinal slot cut in the underside of a stripper member 96 secured to such elevated portion. The various punches carried by the punch holder 35 for operating on the metal strip 11 extend through suitable openings provided in the stripper member 96, and during the upward or return movement of these punches, this stripper member limits the extent of upward movement of the metal strip with the punches.

The supporting and guiding means 34 for the liner strip 11 comprises a longitudinal guideway $34^a$ extending beneath and transversely to the guideway $32^a$ and having a flat floor or support surface therein. The floor of the guideway $34^a$ is formed by the flat top surface $97^a$ of a relatively elevated portion 97 of the die support 33 and by a longitudinal slot cut in the underside of a stripper member 98 secured to such elevated portion 97. The stripper member 98 has suitable openings therein to accommodate the punches 66 and 73 and serves to limit the extent to which the liner strip 11 can move upwardly with these punches, and also limits the extent to which the liner strip is moved upwardly by the above-mentioned pairs of ejector pins 60 and 65.

The various punches of the punch holder 35 can be suitably secured thereto by means of counterbored blocks 102 in which the shouldered upper ends of the punches are confined. Axial adjustment of the punches is accomplished by means of suitable shims 103 (see Fig. 9) provided in the counterbored blocks 102.

When the modified composite article 24 having a smooth exterior devoid of ribs is to be produced, a forming punch 105 which does not have any of the forming grooves 83 is substituted in the apparatus for the forming punch 73. Such a modified forming punch 105 is shown in Fig. 20 of the drawings. The forming punch 105 carries a blanking ring 74 similar to that of the forming punch 73 and this blanking ring cooperates with a die ring 77 in the same manner as explained above for punching out the liner blank 79 from the liner strip.

As shown in Fig. 20, the modified forming means also includes a pressure plate 106 against which the connected metal blank and liner blank are held by the lower end of the forming punch 105 prior to these blanks being forced through the die passage 107 of the forming die by the die stem 69. The pressure plate 106 is supported for downward movement when engaged by the forming punch 105, by means of a group of push pins 108 and a collar 109. The collar 109 is slidably guided on a hanger rod 110 having a fixed threaded connection $110^a$ with the die support 33 and is supported by the upper end of a compression spring 111.

The upward force of the spring 111 transmitted to the pressure plate 106 causes the latter to hold the connected metal and liner blanks against the lower end face of the forming punch 105 while a drawing or forming operation is performed on these blanks during which they are moved upwardly through the die passage 107 by the die stem 69, as explained above, to shape the blanks to the cup-shaped form of the completed article 24. By reason of the pressure-forming or drawing operation thus carried out on the connected blanks, the metal shell of the completed article 24 will have the smooth exterior referred to above.

From the accompanying drawings and the foregoing detailed description, it will now be readily understood that this invention provides a novel method and apparatus by which composite articles can be rapidly and economically produced, and particularly cup-shaped composite articles such as paper-lined thread protectors, or the like, having a cup-shaped shell and a cup-shaped liner nested therein.

Although the method and apparatus of this invention have been illustrated and described herein to a somewhat detailed extent, it will be understood, of course, that the invention is not to be regarded as being limited correspondingly in scope, but includes all changes and modifications coming within the terms of the claims hereof.

Having thus described our invention, we claim:

1. In a method of making composite articles the steps of, advancing a pair of strips of sheet material such that successive portions of one strip overlie successive portions of the other strip, severing article components in succession from a first one of said strips and applying said components at the rate of production thereof to the second one of said strips, clinching portions of said first components which lie inwardly of their outer marginal portions into connected relation with portions of the second strip for securing said first components on said second strip, punching other article components from said second strip such that said other components have the respective first-mentioned components mounted thereon and secured thereto and also have outer marginal portions surrounding the clinched portions and lying adjacent the outer marginal portions of said first-mentioned components, and die shaping the secured-together components to a desired article form by a substantially simultaneous bending of the outer marginal portions of both of said secured-together components.

2. In a method of making composite articles the steps of, advancing a pair of strips of sheet material such that successive portions of one strip overlie successive portions of the other strip, punching openings in a first one of said strips and forming projecting connecting means on such first strip adjacent said openings, severing article components carrying said connecting means from said first strip such that said connecting means is located substantially centrally of said article components and surrounded by outer marginal portions thereof, bringing said article components and the second one of said strips together, mounting said components on said second strip by clinching said connecting means onto said second strip, severing other article components from said second strip such that said other components have the respective first-mentioned components mounted thereon and such that said other components have outer marginal portions surrounding the clinched connecting means, and shaping the connected components to desired article shape by die forming the same including a combined bending and folding of said outer marginal portions of both components into an interlocked engagement.

3. The method of making composite articles which comprises, advancing a metal strip and a liner strip in crossing relation to each other, punching openings in said metal strip, forming connecting projections on said metal strip in adjacent relation to said openings, severing metal blanks from said metal strip such that said metal blanks include said projections on a central portion thereof and surrounded by outer marginal portions of the metal blanks, applying said metal blanks to said liner strip by forcing the projections of said metal blanks through said liner strip and clinching said projections, severing liner blanks from said liner strip such that said liner blanks have the respective metal blanks mounted thereon and such that the clinched projections are located substantially centrally of the liner blanks and surrounded by outer marginal portions of the latter, and bending and shaping said outer marginal portions of both blanks into sleeve shape by pushing the connected blanks through a die passage with the metal blank on the lead side in protective relation to the liner blank.

4. The method of making composite cup-shaped articles which comprises, advancing a metal strip and a fibrous strip in crossing relation to each other, punching openings in said metal strip, forming connecting projections on said metal strip in adjacent relation to said openings, severing substantially disk-shaped metal blanks from said metal strip such that said metal blanks include said projections in a substantially central location thereon and surrounded by outer annular portions of the metal blanks, applying said metal blanks to said fibrous strip by forcing the projections of said metal blanks through said fibrous strip, locking said metal blanks to said fibrous strip by clinching said projections, further advancing said fibrous strip to successively locate the thus mounted metal blanks opposite a die passage, severing substantially disk-shaped liner blanks from said fibrous strip such that the liner blanks carry the respective metal blanks and such that the clinched projections are located substantially centrally of the liner blanks and surrounded by outer annular portions of the liner blanks, and shaping the locked-together metal and liner blanks simultaneously to cup-like form by pushing the locked-together blanks through said die passage and thereby bending and forming said outer annular portions of both blanks to sleeve shape with the sleeve portion formed by the outer annular portions of the metal blank surrounding the sleeve portion formed by the outer annular portions of the liner blank.

5. The method of making paper-lined cup-shaped articles which comprises, advancing a sheet metal strip and a paper strip in crossing relation to each other, forming flange-surrounded openings in said metal strip, punching substantially disk-shaped metal blanks from said metal strip such that the metal blanks have said flange-surrounded openings substantially centrally thereof and surrounded by outer annular portions of the metal blanks, transferring said metal blanks to said paper strip, forcing the flange of each metal blank against and through the paper strip as a punch member, clinching the flanges of the metal blanks for securing the latter to the paper strip, punching substantially disk-shaped paper blanks from said paper strip such that said paper blanks carry said metal blanks and such that the clinched flanges are surrounded by outer annular portions of the paper blanks, and shaping the connected disk-shaped metal and paper blanks substantially simultaneously to nested-cup form by a combined bending and forming of said outer annular portions of said blanks to sleeve shape so that the sleeve portion formed by the outer annular portions of said metal blank lies on the outside of the sleeve portion formed by the outer annular portion of said paper blank and in the same shaping operation forming interlocked ribs in the articles by a combined bending and folding of the blanks at spaced points of said outer annular portions.

6. The method defined in claim 5 in which the shaping of said metal and paper blanks to nested-cup form is accomplished by moving said blanks through a die passage with the metal blank on the lead side of such movement.

7. The method defined in claim 5 in which the paper strip is disposed below the metal strip and the transfer of the metal blanks to the paper strip is by a downward movement onto the latter, and in which the shaping of the connected blanks to nested-cup form is produced by an upward movement of the connected blanks through a hollow die with the metal blank on the lead side of the movement through the hollow die.

8. The method defined in claim 5 in which the transfer of the metal blanks to the paper strip is by a continuation of the punching operation which severs the metal blanks from the metal strip, and in which the shaping of the connected blanks to nested-cup form is produced by movement of the connected blanks through a hollow die with the metal blank on the lead side of the movement through the hollow die, the movement of the connected blanks through said hollow die being a continuation of the punching step by which the paper blanks are severed from said paper strip.

References Cited in the file of this patent

UNITED STATES PATENTS

| Number | Name | Date |
|---|---|---|
| 448,748 | Comings | Mar. 24, 1891 |
| 1,892,178 | Stockfleth | Dec. 27, 1932 |
| 1,972,789 | Newkirk | Sept. 4, 1934 |
| 2,105,426 | McManus | Jan. 11, 1938 |
| 2,331,491 | Menkin | Oct. 12, 1943 |
| 2,348,875 | Beard | May 16, 1944 |
| 2,409,147 | Neuhaus et al. | Oct. 8, 1946 |
| 2,443,185 | Erb | June 15, 1948 |
| 2,610,390 | Locke | Sept. 16, 1952 |
| 2,659,406 | Locke | Nov. 17, 1953 |